United States Patent [19]

Pras

[11] 4,264,234

[45] Apr. 28, 1981

[54] DIRECTIONAL ORIENTATION APPARATUS FOR SURFACE END OF SUBMERGED OIL LINE

[75] Inventor: Stephane C. Pras, Cannes, France

[73] Assignee: Compagnie Francaise des Petroles, Paris, France

[21] Appl. No.: 30,791

[22] Filed: Apr. 17, 1979

[30] Foreign Application Priority Data

Apr. 18, 1978 [FR] France ................. 78 12651

[51] Int. Cl.³ ........................................ F16L 1/00
[52] U.S. Cl. ............................ 405/158; 405/168; 405/169
[58] Field of Search .................... 405/154–172; 175/5, 7

[56] References Cited

U.S. PATENT DOCUMENTS

| | | | |
|---|---|---|---|
| 2,606,003 | 8/1952 | McNeill | 175/7 |
| 3,259,197 | 7/1966 | Lacy et al. | 175/5 |
| 3,496,898 | 2/1970 | Morgan | 175/7 X |
| 3,581,506 | 1/1971 | Howard | 175/7 X |
| 3,605,415 | 9/1971 | Mohlman | 405/168 |
| 4,030,310 | 6/1977 | Schirtzinger | 175/5 X |
| 4,053,022 | 10/1977 | Mercier | 175/5 |
| 4,068,490 | 1/1978 | Jegousse | 405/166 |

*Primary Examiner*—Dennis L. Taylor
*Attorney, Agent, or Firm*—Sughrue, Rothwell, Mion, Zinn and Macpeak

[57] ABSTRACT

For holding the end of an immersed suspended elongate member, e.g. a flow line or flow line bundle for a well, in a constant direction in spite of changes in the direction of the surface retaining means, e.g. a ship, from which the elongate member is suspended, the upper end of the member is secured to a trolley secured to a slide which is mounted on rollers movable on circular rails coaxial with the upper end of the member. The slide is rotatable about the axis of the rails and is rotated to compensate for any changes in the direction of the surface retaining means.

14 Claims, 9 Drawing Figures

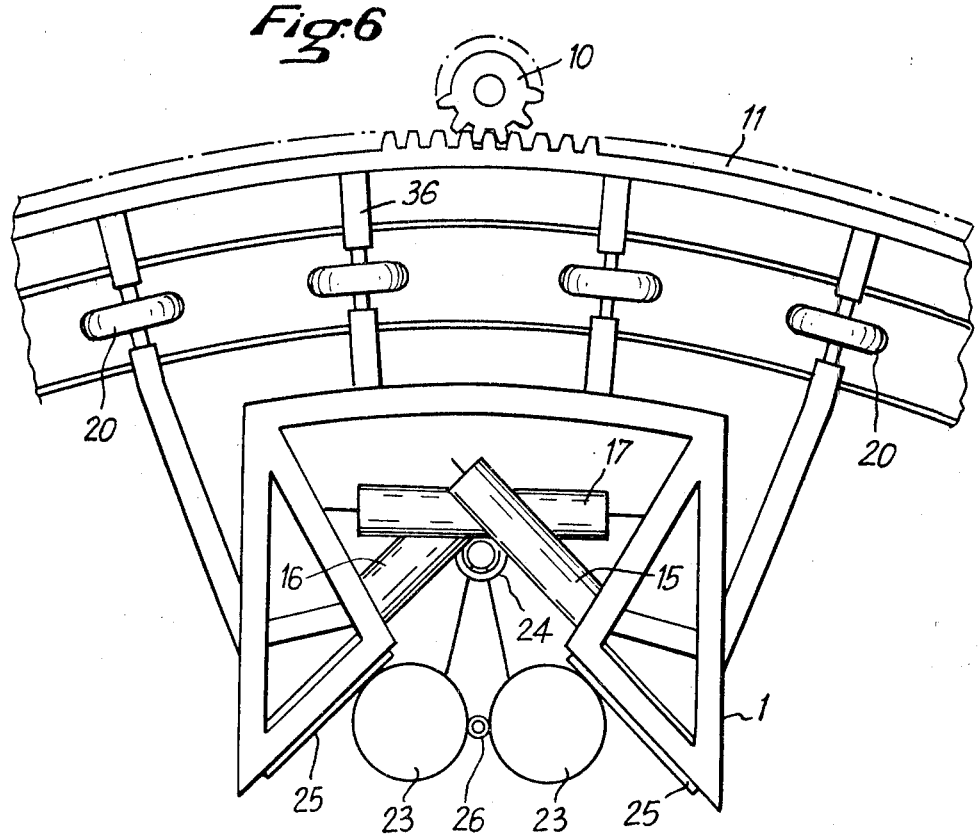
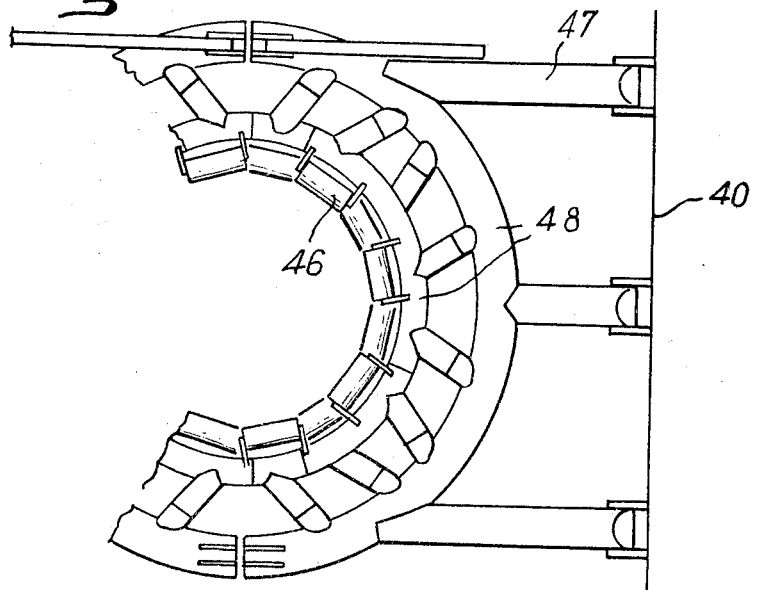

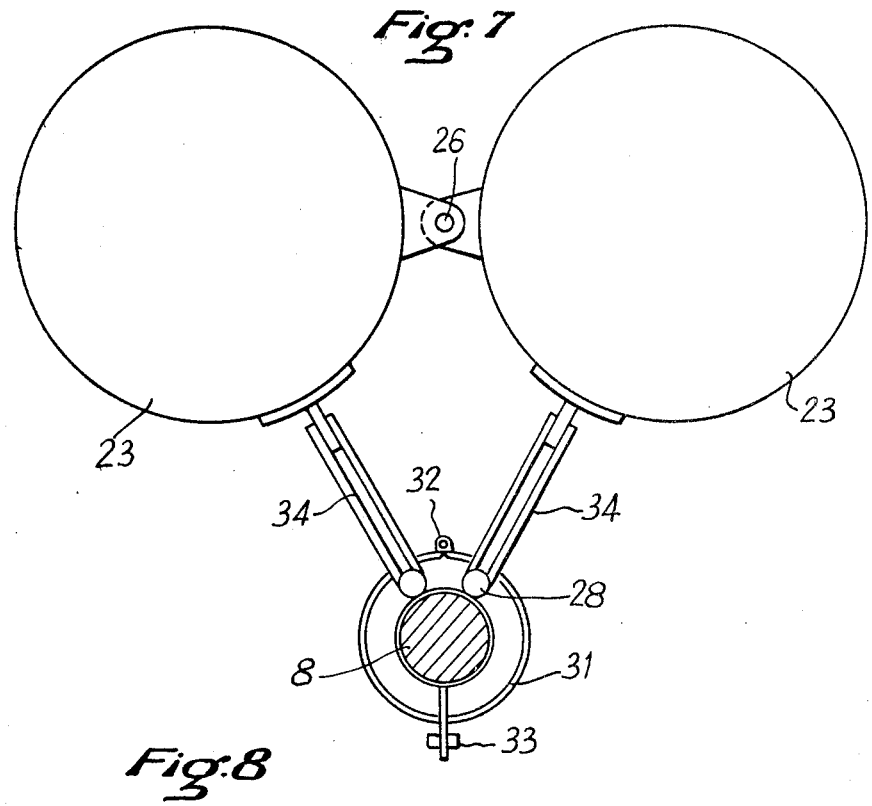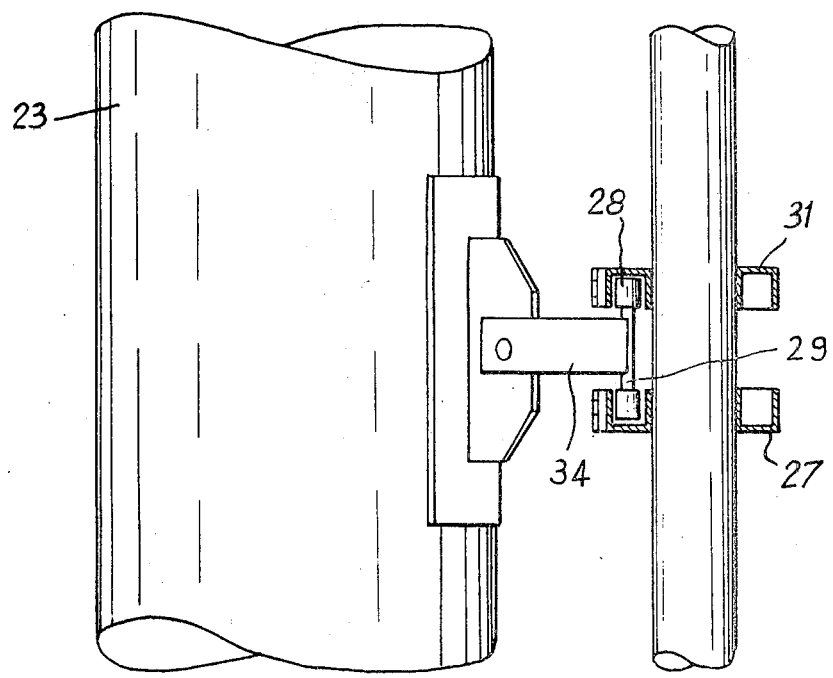

DIRECTIONAL ORIENTATION APPARATUS FOR SURFACE END OF SUBMERGED OIL LINE

The invention relates to apparatus for maintaining the direction of an elongate member which has been or is being immersed, the top end of the member being held by a retaining means at the surface.

Operations for laying submerged flow lines for collecting oil products are examples of work in which elongate members have to be held in a constant direction irrespective of the direction of the surface retaining means from which the upper end of the elongate member is suspended. The flow lines are preferably laid by giving them a J cross-section, one end of the flow line being suspended from the surface retaining means, as soon as the flow line has come to rest at a certain depth. In this method the surface retaining means has to be kept in a clearly-defined direction, which is impossible in practice without applying excessive force, owing to variations in wind, currents and swell, even if use can be made of a ship with dynamic positioning, i.e. a ship capable of staying at a given place in a given direction.

According to one aspect of the invention, there is provided apparatus for holding an immersed elongate member in a constant direction, the member being supported by a surface retaining device comprising a central well and extending through the central well, the apparatus comprising suspension means for engaging the upper end of the elongate member and from which the elongate member is suspended, and wherein the direction of the surface retaining device is made independent of the guidance of the elongate member extending through the well thereof.

Advantageously the apparatus comprises guide means for guiding the elongate member and connected to the suspension means, and drive means for rotating the guide means and suspension means relative to the well about the axis of the suspension means.

It can thus be easy to guide the surface retaining means in a given direction while holding the elongate member in a constant vertical plane, its suspension means rotating relative to the well.

Lateral guide means may be provided allowing some liberty of transverse motion of the elongate member in its vertical plane, while allowing the elongate member to move longitudinally. The elongate member can thus bend somewhat with the swell of the water without being excessively stressed by the connections between the suspension means and the elongate member.

Means for holding and guiding the elongate member may be provided comprising means for guiding floats which give buoyancy to the elongate member. This latter feature has the advantage that the floats can be mounted on board the surface retaining device, i.e. without using divers.

Preferably the elongate member has a partly vertical and partly inclined shape so that the suspension means for securing and suspending the upper end of the elongate member can be horizontal with the elongate member inclined at any desired angle inside the well. It is thus easy to join sections of the elongate member end to end in the vertical position, thus facilitating any change in direction of the surface retaining means.

Of course, the apparatus can be adapted to any kind of elongate member, inter alia to any occassion when one or a bundle of elongate members is suspended from a surface retaining means and has to be kept in a given direction, as in the case of a tube having a lower end connected to an ore-extracting device and an upper end connected to a tipping means at the surface.

The invention will be more fully understood from the following description of embodiments thereof, given by way of example only, with reference to the accompanying drawings.

In the drawings:

FIG. 6 is a diagrammatic partial plan view of part of the apparatus of FIG. 2 for guiding a flow line means equipped with floats;

FIG. 7 is an enlarged view of means for securing floats to the flow line means;

FIG. 8 is a view in elevation of the means for securing floats to the flow line means; and FIG. 9 is a diagrammatic plan view of a modification of part of the apparatus of FIG. 2.

Figure 1:
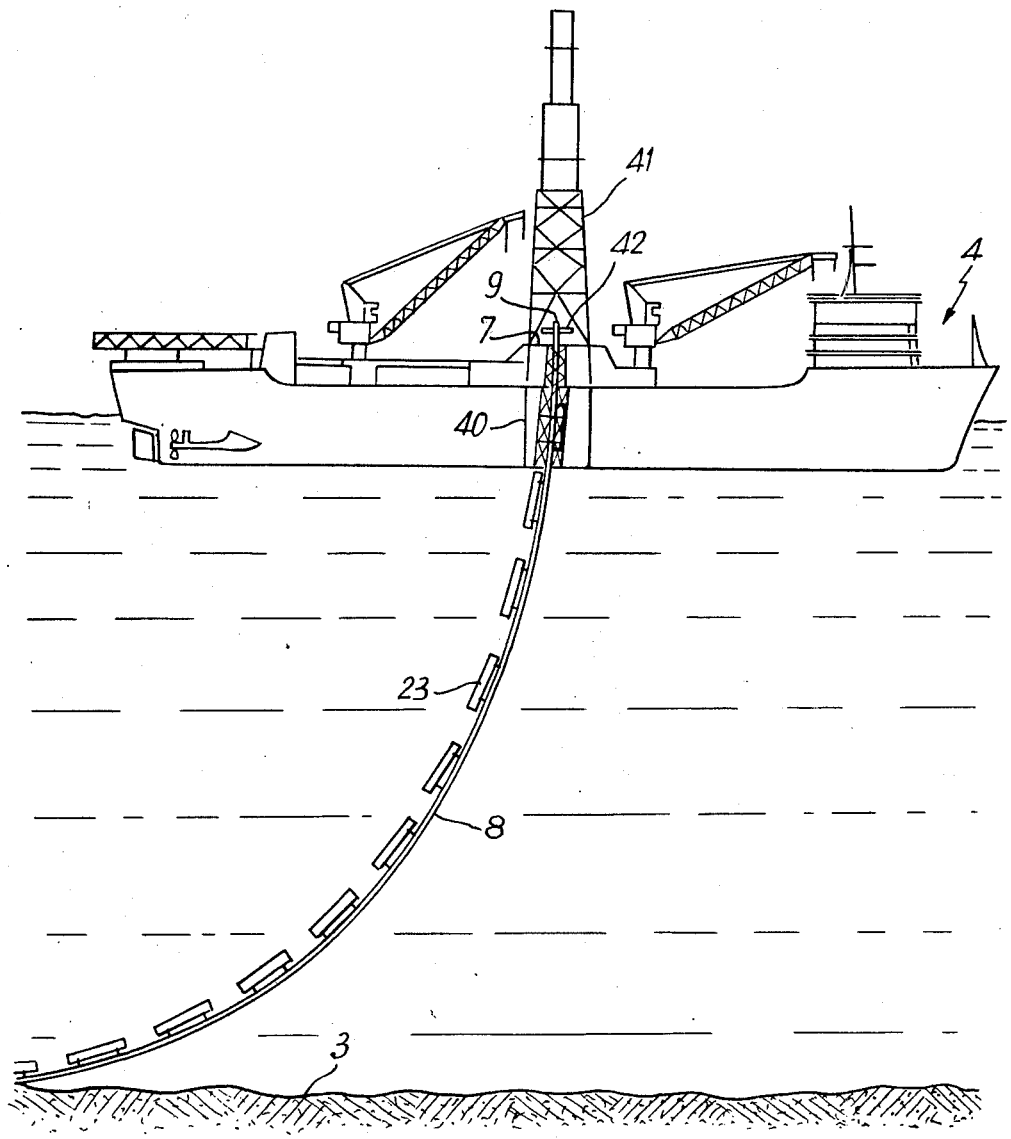
FIG. 1 is a diagrammatic view of the surface retaining means during the laying of flow line means.

The apparatus for keeping the direction of a surface retaining means, e.g. a ship, independent of the direction of an elongate member suspended therefrom is adapted to ships with dynamic positioning but is equally suitable for any surface retaining means comprising a central well, as shown in FIG. 1. By way of example an embodiment of the apparatus will now be described for laying an elongate member in the form of a flow line or bundle of flow lines for an oil or gas well.

FIG. 1 shows a flow line means 8 which is provided with floats 23 and is in the form of a J in the part between the bottom 3 of the water and a drilling platform 7 on a surface retaining means 4. The part of the flow line means near its upper end 9 is vertical and the flow line means 8 slopes progressively inside well 40 of the surface retaining means. It is thus easy to join the end of a new section of the flow line means to the end 9, by vertically joining the end of the new section, using a derrick 41 and a surface of rotation diagrammatically indicated at 42.

Figure 2:
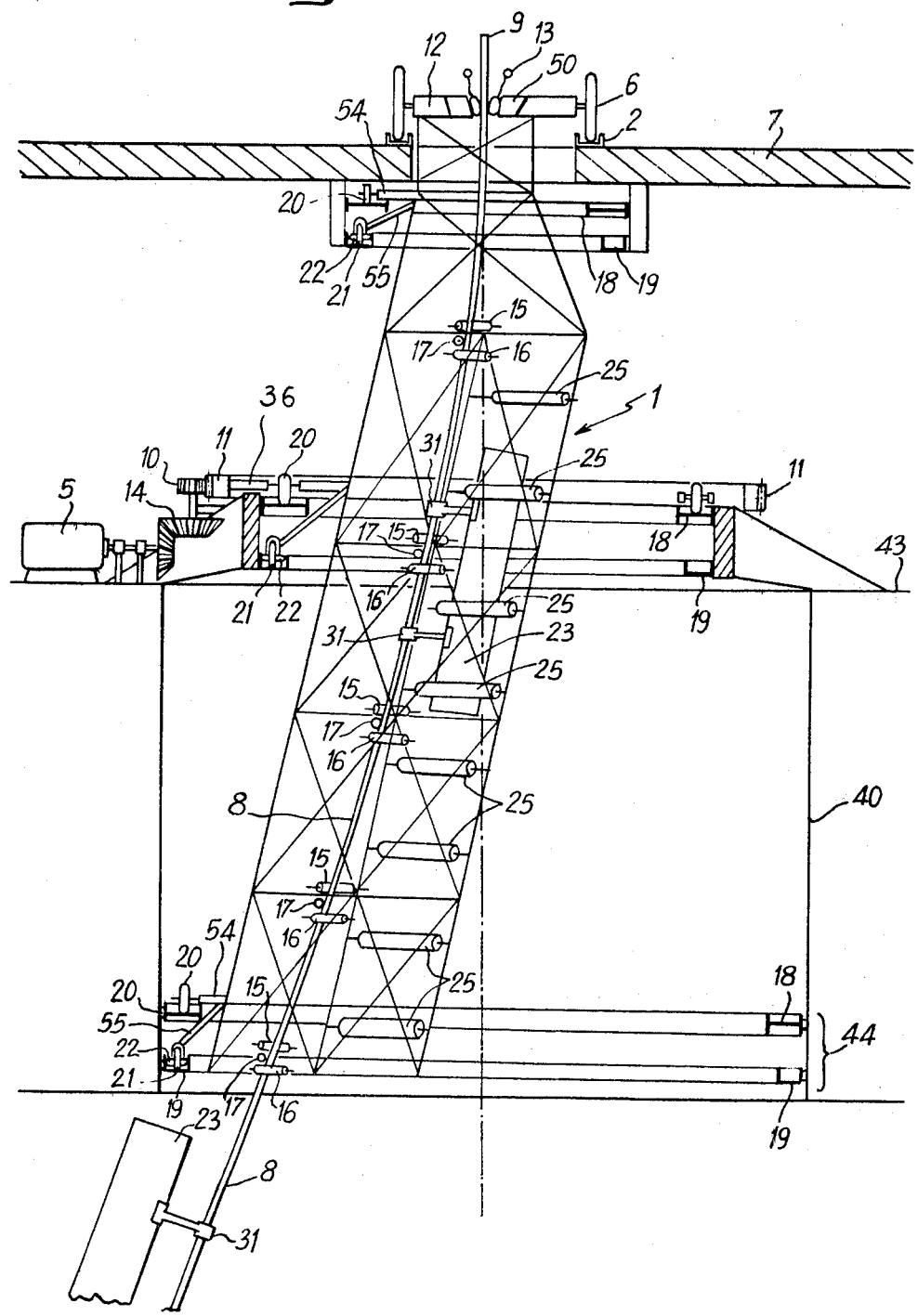
FIG. 2 is a diagrammatic elevation, partly in section of an embodiment of apparatus in accordance with the invention on the surface retaining means of FIG. 1.
Figure 4:
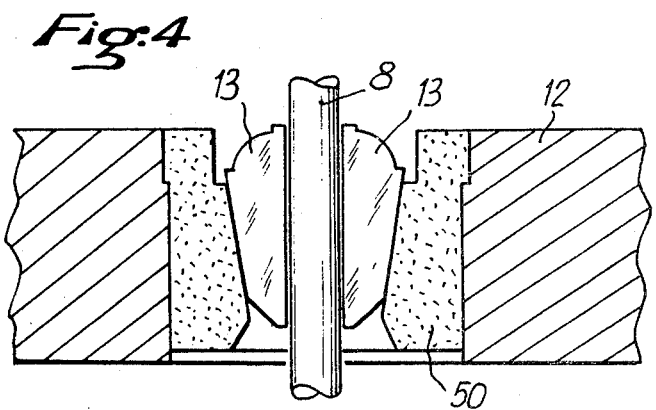
FIG. 4 is a view in elevation of suspension means for suspending the end of the flow line means in the apparatus of FIG. 2.
Figure 5:
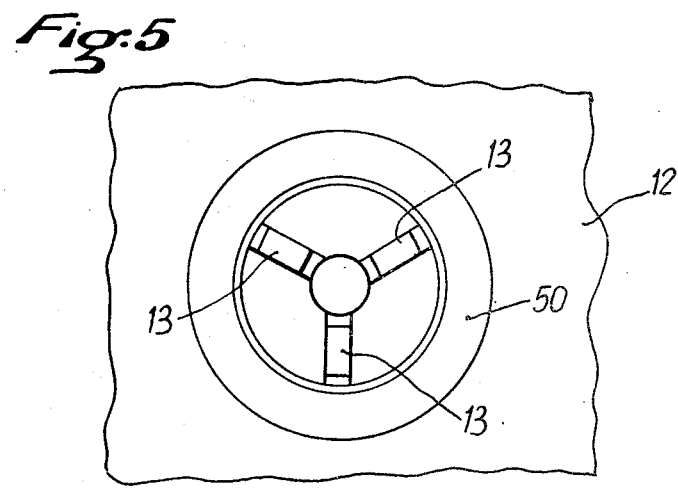
FIG. 5 is a plan view of the suspension means of FIG. 4.

A slide 1, enabling the direction of means 4 to be independent of the direction of flow line means 8, is shown in general view in FIG. 2. At its upper end, it comprises means 13 for securing the top end 9 of flow line means 8, the securing means 13 being held by a trolley 12 having fittings 50 for receiving the securing means 13. The securing means 13 may be ordinary wedges as shown in FIGS. 4 and 5.

The slide trolley 12 is borne by rollers 6 moving on circular rails 2 on the drilling platform 7. The assembly can be supplemented by two further circular rails 18, 19 secured to and below platform 7. Arms 54 and 55 of the upper part of slide 1 bear rollers 20 and 21 with horizontal axes and which move on rails 18 and 19 respectively. Rail 19 has vertical flanges acting as circular guides for rollers 22 which have vertical axes.

Figure 3:
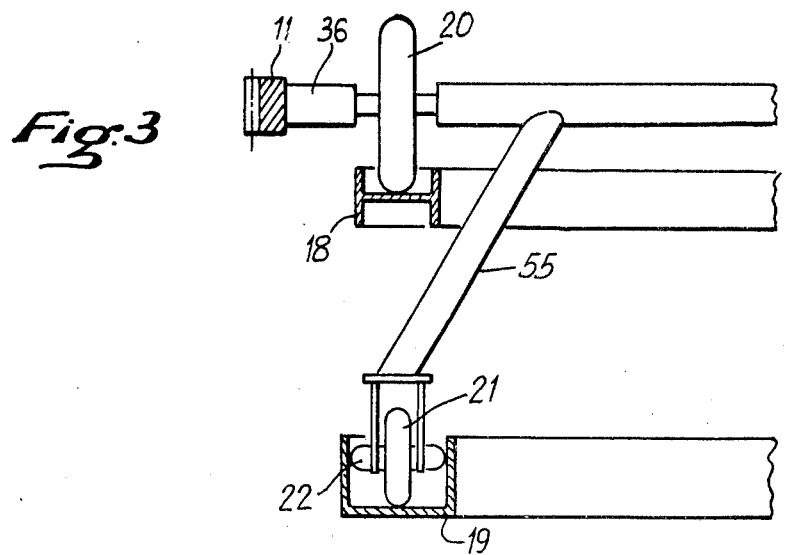
FIG. 3 is an enlarged partial view of part of the apparatus of FIG. 2 for rotating the apparatus.

The central part of slide 1 is inclined and a partially similar assembly is associated with the central inclined part of slide 1 above the central platform 43 giving access to well 40. This assembly, like the preceding assembly, comprises rails 18 and 19 (FIGS. 2 and 3) on which rollers 20, 21 and 22 run, but the support 36 of rollers 20 is also secured to a crown gear 11 engaging a gear wheel 10 driven by a set of bevel gears 14 actuated by a motor 5 secured to platform 43.

The lower part of the slide 1 is held and guided in part 44 of well 40 by an assembly similar to the assembly below platform 7, like components being given like reference numerals.

Thus, the top and bottom parts of slide 1 are held and guided by sets of rollers 20, 21, 22 which are freely movable on corresponding rails 18 and 19. The central part of the slide, which is also held and guided by similar means, also has the crown gear 11 which can be driven by motor 5 and the gear train 14–10.

The motor 5 can be actuated either manually or automatically in accordance with any change in the direction or course of the surface retaining means 4. Consequently, slide 1 cannot be arbitrarily rotated simply by friction of its rollers on means 4, but is positively driven around the axis of derrick 41 in the opposite direction to the rotation of means 4 and through an angle equal to the angle through which means 4 rotates, so that slide 1 retains its original direction.

During the aforementioned maintenance of direction, horizontal axis guide rollers 15, 16 and 17 (see more particularly FIG. 6) remain in the same direction and remain adjacent the flow line means 8 on the same side thereof, so that, if means 8 comes away from the surface of the rollers as a result of a bending motion produced for example by the rapid lowering of the surface retaining means, the flow line means 8 is brought back to the apex of the angle formed by the angular arrangement of the lateral guide rollers 15 and 16. Rollers 17 are also arranged so as to give the desired cross-section to the part of the flow line means 8 inside the well, whereas rollers 15 and 16 are positioned so as to hold the flow line means 8 in a constant vertical plane.

Rollers 25 are mounted on slide 1 to guide the floats 23, which are preferably mounted in pairs as shown in FIGS. 6–8. The rollers 25 are mounted on slide 1 (as clearly shown in FIG. 6) so as not to interfere with the guidance of the flow line means 8 or with the free bending thereof, and are arranged with their axes parallel to the axes of rollers 15 and 16.

Each pair of floats 23 is interconnected by a pin 26 and each float is connected by an arm 34 to a shaft 29 bearing rollers 28 and moving in a movable annular collar 31 comprising two circular U-section members 27 mounted on the flow line means 8. The collar 31 is made up of two half annular parts jointed at 32, the ends remote from joint 32 being connected by an explosive bolt 33.

Consequently when, during the motion of the surface retaining means 4 after a new section of flow line means 8 has been joined, a pair of floats 23 moves entirely out of the lower end of the well 40, they escape from the guide system and, after pin 26 has been released by any known means, automatically return to an equilibrium position above means 8, as shown in FIG. 2 owing to rollers 28 running on collar 31. After the flow line means has been laid on the seabed 3, the floats 23 can be recovered by actuating the explosive bolt 33 by any known means.

When the flow line means does not require floats, slide 1 can be simplified by omitting the lower part below the drilling platform 7, the main function of which is to guide the floats in well 40. As before, a motor can be used to drive the upper part of the slide for suspending the flow line means, to avoid any twisting of the top part of the flow line means when the flow line means is extended by joining on the end of a new upper section. The lower part of the guide system may if required comprise horizontal axis rollers 46 (FIG. 9) secured to well 40 by cross-members 47 bearing rings 48 inside which the rollers 46 are disposed. The rollers, the axes of which are at a tangent to horizontal circumferences, are kept at a distance from the well varying with their level and decreasing towards the lower end of the well, so that the flow line means 8 cannot incline excessively during its descent in the well. The corresponding part of means 8 can thus roll and slide from one roller 46 to the next if there is any change in the course of the surface retaining means 4, whereas the upper end of the flow line means 8 stays in the same direction, so that the flow line means as a whole is not twisted.

The upper part of the apparatus may also be provided with a suitable device for compensating for the action of the swell, the device supporting the trolley 12, roller 6 and rail 2. Numerous suitable swell compensating devices are known.

It can be seen that, without departing from the scope of the invention, the various aforementioned means can be replaced by their equivalents. The shape of the slide can be varied in dependence on the floats associated with the elongate member and in dependence on devices on the surface retaining means, e.g. a swell compensation device, of which there are numerous varieties.

There is thus provided an apparatus whereby the direction of the surface retaining means can be independent of the direction of the elongate member lowered through its well, and which enables the surface retaining means to change direction through 360° without moving the suspension means which hold the upper end of the elongate member at the surface.

What is claimed is:

1. An apparatus for laying underwater pipeline from a surface ship having an open ended central wall extending therethrough, comprising:
    (a) means on the ship for engaging an upper end of the pipeline and suspending it through the well, whereafter the downwardly running pipeline curves from a substantially vertical orientation at the surface to a substantially horizontal orientation at the seabed in a desired laying direction,
    (b) means rotatably mounting the engaging and suspending means on the ship, and
    (c) drive means for rotating the engaging and suspending means in a direction opposite to any change in direction of the surface ship and through the same angle, whereby the laying direction of the pipeline is maintained and the twisting thereof is avoided inspite of directional changes of the surface ship due to winds, ocean currents or waves.

2. Apparatus as claimed in claim 1, wherein the portion of the pipeline extending through the well is inclined to the vertical.

3. Apparatus as claimed in claim 1, wherein the engaging and suspending means comprises a rotatable trolley on which means for clamping the upper end of the pipeline is mounted.

4. Apparatus as claimed in claim 3, wherein the rotatably mounting means comprises a circular rail coaxial with said engaging and suspending means, rollers movable on said circular rail, and means mounting said trolley on said rollers.

5. Apparatus as claimed in claim 3, wherein the engaging and suspending means further comprises a slide for guiding said pipeline, said slide being held and guided by rollers moving on circular rails and in rings, and means securing said slide to said trolley.

6. Apparatus as claimed in claim 1, further including guide means for guiding the pipeline, said guide means being secured to said engaging and suspending means.

7. Apparatus as claimed in claim 6, wherein said guide means is supported by a slide rotatable about the axis of said engaging and suspending means.

8. Apparatus as claimed in claim 7, wherein said drive means comprises a motor connected to a gear assembly engaging a crown gear secured to a central part of said slide.

9. Apparatus as claimed in claim 1, wherein said engaging and suspending means is coaxial with a derrick on the surface ship.

10. Apparatus as claimed in claim 6, wherein said guide means comprises a plurality of sets of rollers disposed in vertically spaced horizontal planes, each set of rollers comprising rollers for determining the slope of the pipeline and rollers constituting lateral guides therefor.

11. Apparatus as claimed in claim 10, comprising float guide means for guiding floats secured to the pipeline.

12. Apparatus as claimed in claim 11, wherein said float guide means comprises horizontal rollers extending in the same direction as said lateral guide rollers.

13. Apparatus as claimed in claim 11, wherein the floats are attached in pairs to the pipeline by connection means freely rotatable in a collar around the pipeline.

14. Apparatus as claimed in claim 10, wherein said rollers are arranged with their axes tangent to concentric circles in said vertically spaced horizontal planes, the rollers having lengths such that one roller can be freely introduced in place of an adjacent roller if the surface ship changes direction, the diameter of the circles increasing towards the lower end of said well.

* * * * *